United States Patent [19]

Uhlarik

[11] 4,059,984

[45] Nov. 29, 1977

[54] FLUID LEAK DETECTOR

[75] Inventor: William J. Uhlarik, Monterey Park, Calif.

[73] Assignee: International Telephone and Telegraph Corporation, New York, N.Y.

[21] Appl. No.: 732,497

[22] Filed: Oct. 14, 1976

[51] Int. Cl.² ............................................. G01M 3/28
[52] U.S. Cl. ................................................ 73/40.5 R
[58] Field of Search ................... 73/40, 40.5 R, 23, 54

[56] References Cited

U.S. PATENT DOCUMENTS

| | | | |
|---|---|---|---|
| 2,449,067 | 9/1948 | Guillemin, Jr. | 73/23 |
| 2,449,556 | 9/1948 | Kirkley | 73/40 |
| 3,086,386 | 4/1963 | Kapff | 73/54 X |
| 3,817,085 | 6/1974 | Stubbs | 73/23 |

Primary Examiner—Richard C. Queisser
Assistant Examiner—Joseph W. Roskos
Attorney, Agent, or Firm—A. Donald Stolzy

[57] ABSTRACT

A fluid circuit wherein the cooling coil flow resistance of a furnace and the flow resistance of a needle valve are balanced against those of two orifices to determine cooling coil leakage.

8 Claims, 1 Drawing Figure

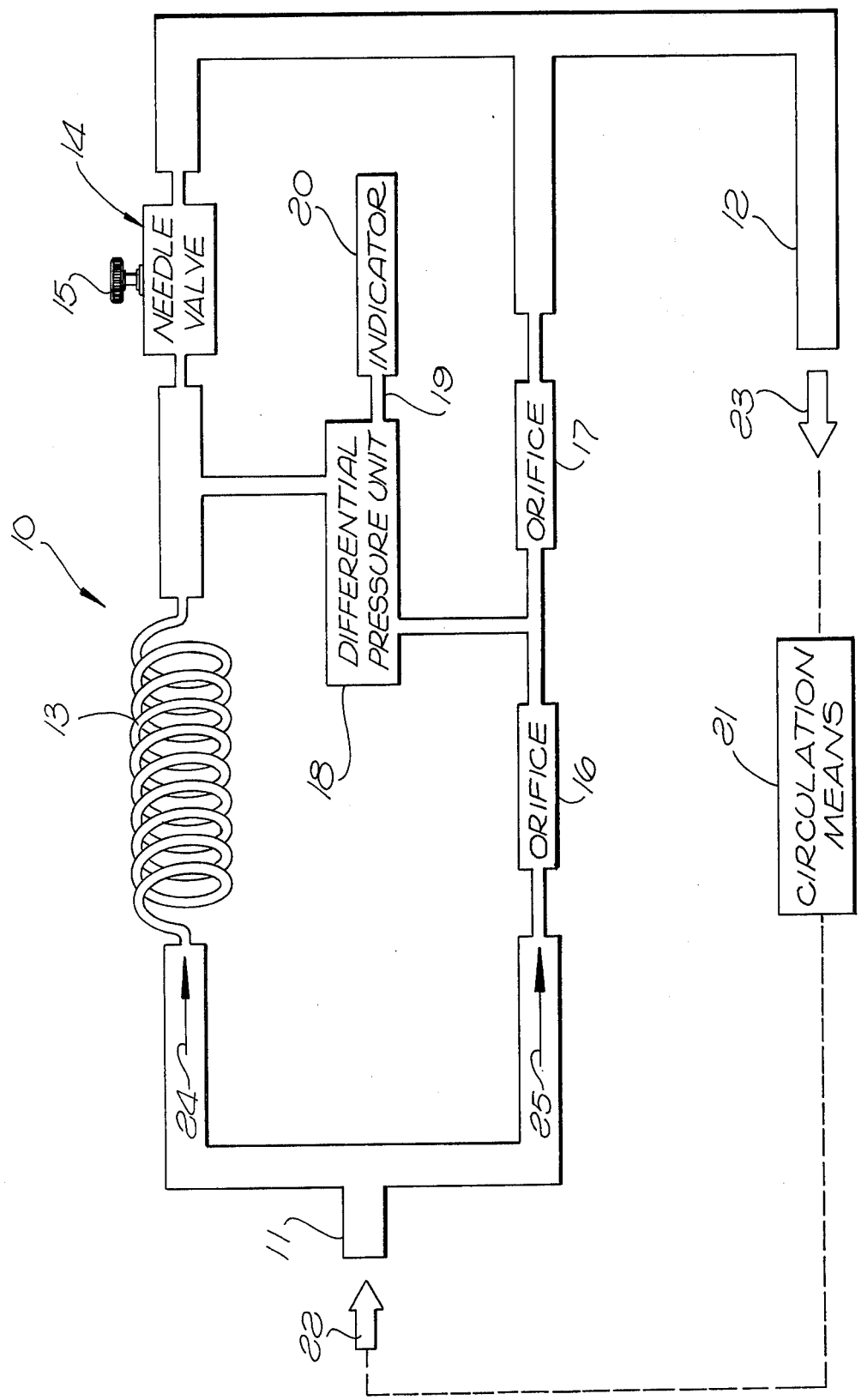

FLUID LEAK DETECTOR

BACKGROUND OF THE INVENTION

This invention relates to fluid flow monitoring systems, and more particularly to a system for detecting a leak in a conduit or the like to receive the flow of a fluid.

In the past, a pneumatic or hydraulic type bridge has been provided with a differential pressure unit (DPU) to indicate the constituent in a mixture removed by a scrubber or the viscosity of a fluid. For example, see U.S. Pat. No. 2,449,067 issued Sept. 14, 1948. However, these types of equipments are not employed in monitoring systems to determine the failure of fluid conduits or the like.

SUMMARY OF THE INVENTION

In accordance with the leak detector of the present invention, apparatus is provided comprising a system having first, second, third and fourth legs to carry a fluid, an inlet, an outlet, said first and second legs being connected in succession from said inlet to said outlet, said third and fourth legs being connected in succession from said inlet to said outlet, one of said first and second legs being an adjustable valve, said third and fourth legs providing constrictions, a DPU connected from the junction of said first and second legs to the junction of said third and fourth legs, and an indicator connected from said DPU to indicate the differential pressure sensed thereby.

In accordance with the foregoing, the DPU indicator will show a pressure difference if the first leg leaks. The first leg may thus include the cooling coils of a furnace, if desired.

The above-described and other advantages of the present invention will be better understood from the following detailed description when considered in connection with the accompanying drawings.

BRIEF DESCRIPTION OF THE DRAWINGS

In the drawings which are to be regarded as merely illustrative, the FIGURE is a diagrammatic view of a fluid leak detector.

DESCRIPTION OF THE PREFERRED EMBODIMENTS

A leak detector constructed in accordance with the present invention is indicated at 10 in the FIGURE including a fluid inlet 11, a fluid outlet 12, a first leg including furnace cooling coils 13, a second leg including a needle valve 14, needle valve 14 having a knurled knob 15 to adjust the pressure drop across needle valve 14, third and fourth legs including orifices 16 and 17, a DPU 18 connected from between the junction of coils 13 and needle valve 14 to between the junction of orifices 16 and 17. The DPU 18 is conventional and has a conventional rotatable output shaft 19 to operate an indicator 20.

Circulation means 21 may be other furnace apparatus to circulate a fluid in the direction of arrows 22, 23, 24 and 25.

OPERATION

In the operation of the leak detector 10 shown in the FIGURE, needle valve knob 15 is turned until indicator 20 shows some known value — preferably zero. Thus, if later on a leak should develop in coils 13, such a leak will be shown on indicator 20.

The flow resistance through the orifices 16 and 17 is greater than that through coils 13 and needle valve 14. For example, the volume flow rate through coils 13 is about 10 times that through orifice 16.

What is claimed is:

1. A fluid flow detector, said detector comprising: first, second, third and fourth conduits; an inlet; an outlet, said first and second conduits being connected in succession from said inlet to said outlet, one of said first and second conduits having an adjustable valve, said third and fourth conduits being connected in succession from said inlet to said outlet, each of said third and fourth conduits including a constriction to the flow of fluid therethrough such that the flow through said third and fourth conduits is substantially smaller than that through said first and second conduits; a differential pressure unit (DPU); a fifth conduit connected from between said first and second conduits to said DPU; a sixth conduit connected from between said third and fourth conduits to said DPU; and means connected from said DPU to indicate the difference between the pressures within said fifth and sixth conduits, said indicator means being actuated when the other of said first and second conduits is leaking.

2. The invention as defined in claim 1, wherein said valve is adjusted to a position such that the pressures within said fifth and sixth conduits are equal.

3. The invention as defined in claim 2, wherein the flow through said third and fourth conduits is less than about one-tenth of the flow in said first and second conduits.

4. The invention as defined in claim 3, wherein the flow resistance of said third conduit is approximately equal to that of said fourth conduit.

5. The invention as defined in claim 2, wherein the flow resistance of said third conduit is approximately equal to that of said fourth conduit.

6. The invention as defined in claim 1, wherein the flow through said third and fourth conduits is less than about one-tenth of the flow in said first and second conduits.

7. The invention as defined in claim 6, wherein the flow resistance of said third conduit is approximately equal to that of said fourth conduit.

8. The invention as defined in claim 1, wherein the flow resistance of said third conduit is approximately equal to that of said fourth conduit.

* * * * *